United States Patent
Edwards et al.

(10) Patent No.: US 10,402,801 B1
(45) Date of Patent: Sep. 3, 2019

(54) MULTI-SLOT AUTOMATED TELLER MACHINE

(71) Applicant: Capital One Services, LLC, McLean, VA (US)

(72) Inventors: Joshua Edwards, Philadelphia, PA (US); Abdelkader Benkreira, Washington, DC (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/052,723

(22) Filed: Aug. 2, 2018

(51) Int. Cl.
  *G06K 7/00* (2006.01)
  *G06Q 20/10* (2012.01)
  *G07F 19/00* (2006.01)
  *G06Q 20/40* (2012.01)

(52) U.S. Cl.
  CPC ..... *G06Q 20/1085* (2013.01); *G06Q 20/4014* (2013.01); *G07F 19/203* (2013.01); *G07F 19/205* (2013.01)

(58) Field of Classification Search
  USPC .......................... 235/375–385; 705/5, 35–45
  See application file for complete search history.

(56) References Cited

U.S. PATENT DOCUMENTS

| | | | | |
|---|---|---|---|---|
| 2003/0066876 A1* | 4/2003 | Goldman | ........... | G06Q 20/4014 235/379 |
| 2004/0154964 A1* | 8/2004 | Jones | ................. | G07D 11/0066 209/534 |
| 2017/0206749 A1* | 7/2017 | Takada | ................... | B65H 31/24 |

* cited by examiner

*Primary Examiner* — Matthew Mikels
(74) *Attorney, Agent, or Firm* — DLA Piper LLP (US)

(57) ABSTRACT

Embodiments disclosed herein generally related to an automated teller machine (ATM) and a method of operating the same. In one embodiment, an apparatus is disclosed herein. The apparatus includes a body, a display, two or more currency dispensing components, two or more currency cartridges, two or more tracks, and a controller. Each currency dispensing component is dedicated to a specific currency denomination. The two or more currency cartridges are configured to store currency. Each currency cartridge dedicated to a specific currency denomination. Each track extends between a currency dispensing component and a currency cartridge. The two or more tracks are configured to transmit currency from the two or more currency cartridges to the two or more currency dispensing components. The controller is in communication with the display, the two or more currency dispensing components, the two or more currency cartridges, and the two or more tracks.

20 Claims, 5 Drawing Sheets

MULTI-SLOT AUTOMATED TELLER MACHINE

FIELD OF THE DISCLOSURE

The present disclosure generally relates to an automated teller machine (ATM) and a method of operating the same.

BACKGROUND

Currently, there are various means in which consumers may transact with third party vendors. Credit card products are one instrument that are offered and provided to consumers by credit card issuers (e.g., banks and other financial institutions). With a credit card, an authorized consumer is capable of purchasing services and/or merchandise without an immediate, direct exchange of cash. Rather, the consumer incurs debt with each purchase. Debit cards are another type of instrument offered and provided by banks (or other financial institutions) that are associated with the consumer's bank account (e.g., checking account). Transactions made using a debit card are cleared directly from the cardholder's bank account. Still further, in the digital age, a consumer may use a computing device, such as a mobile phone, to perform various transactions.

SUMMARY

Embodiments disclosed herein generally related to an automated teller machine (ATM) and a method of operating the same. In one embodiment, an apparatus is disclosed herein. The apparatus includes a body, a display, two or more currency dispensing components, two or more currency cartridges, two or more tracks, and a controller. The body defines interior volume. The display is disposed in the interior volume. Each currency dispensing component is dedicated to a specific currency denomination. The two or more currency cartridges are configured to store currency. Each currency cartridge dedicated to a specific currency denomination. Each track extends between a currency dispensing component and a currency cartridge. The two or more tracks are configured to transmit currency from the two or more currency cartridges to the two or more currency dispensing components. The controller is in communication with the display, the two or more currency dispensing components, the two or more currency cartridges, and the two or more tracks.

In some embodiments, the apparatus further includes two or more identifiers. Each identifier is positioned adjacent each respective currency dispensing component. The two or more identifiers indicate the specific currency denomination assigned to the respective currency dispensing component.

In some embodiments, each of the two or more identifiers is braille.

In some embodiments, the apparatus further includes a payment card receiving component.

In some embodiments, a first currency dispensing component of the two or more currency dispensing components outputs a first dedicated currency denomination.

In some embodiments, a second currency dispensing component of the two or more currency dispensing components outputs a second dedicated currency denomination, different from the first dedicated currency denomination.

In another embodiment, a computer system is disclosed herein. The computer system includes an automated teller machine (ATM). The ATM includes a display, two or more currency dispensing components, and a controller. Each currency dispensing component is dedicated to a specific currency denomination. The controller includes a processor and a memory. The memory has programming code stored thereon, which, when executed by the processor, performs an operation. The operation includes receiving a first input from a user via a payment card component in the ATM. The operation includes receiving, via the display, one or more user credentials. The operation includes verifying the user credentials with a third party organization. Upon receiving verification from the third party organization, the operation further includes prompting the user to submit a withdrawal request comprising a withdrawal amount and a denomination request. The operation further includes dispensing the withdrawal amount according to the denomination request, wherein each denomination is output via the dedicated currency dispensing component.

In some embodiments, the operation of dispensing the withdrawal amount according to the denomination request includes dispensing a first portion of the withdrawal amount via a first currency dispensing component of the two or more currency dispensing components, determining that the user removed the first portion of the withdrawal amount from the first currency dispensing component, and dispensing a second portion of the withdrawal amount via a second currency dispensing component of the two or more currency dispensing component.

In another embodiment, the operation of dispensing the withdrawal amount according to the denomination request includes simultaneously dispensing a first portion of the withdrawal amount via a first currency dispensing component of the two or more currency dispensing components and a second portion of the withdrawal amount via a second currency dispensing component of the two or more currency dispensing components.

In some embodiments, the operation of receiving the user credentials includes receiving, via a number pad in the ATM, a personal identification number.

In some embodiments, the operation of verifying the user credentials with the third party organization includes generating a verification packet comprising the personal identification number and a number of a payment card inputted via the payment card component, identifying a financial organization associated with the payment card, and transmitting the verification packet to a web server associated with the financial organization.

In some embodiments, the operation of receiving the first input from the user via the payment card component in the ATM includes receiving a payment card via the payment card component, determining that the payment card includes a magnetic stripe, and identifying a user account number via the magnetic stripe.

In some embodiments, the operation of receiving the first input from the user via the payment card component in the ATM includes receiving a payment card via the payment card component, determining that the payment card includes an integrated circuit embedded therein, and identifying a user account number via the integrated circuit.

In another embodiment, an apparatus is disclosed herein. The apparatus includes a body, a display, two or more currency dispensing components, two or more currency cartridges, and a controller. The body defines defining an interior volume. The display is disposed in the interior volume. Each currency dispensing component is dedicated to a specific currency denomination. The two or more currency cartridges are configured to store currency. Each currency cartridge is dedicated to a specific currency denomination. The controller is in communication with the display, the two or more currency dispensing components, and the two or more currency cartridges. The controller includes a processor and a memory. The memory has programming code stored thereon, which, when executed by the processor, performs an operation. The operation includes receiving, via the display, a withdrawal request including a withdrawal amount and a denomination request. The operation includes dispensing the withdrawal amount according to the denomination request. Each denomination is output via the dedicated currency dispensing component.

In some embodiments, the apparatus further includes two or more tracks. Each track extends between a currency dispensing component and a currency cartridge. The two or more tracks are configured to transmit currency from the two or more currency cartridges to the two or more currency dispensing components.

In some embodiments, the operation of dispensing the withdrawal amount according to the denomination request includes dispensing a first portion of the withdrawal amount via a first currency dispensing component of the two or more currency dispensing components, determining that the user removed the first portion of the withdrawal amount from the first currency dispensing component, and dispensing a second portion of the withdrawal amount via a second currency dispensing component of the two or more currency dispensing component.

In some embodiments, the operation of dispensing the withdrawal amount according to the denomination request includes simultaneously dispensing a first portion of the withdrawal amount via a first currency dispensing component of the two or more currency dispensing components and a second portion of the withdrawal amount via a second currency dispensing component of the two or more currency dispensing components.

In some embodiments, the apparatus further includes two or more identifiers. Each identifier is positioned adjacent each respective currency dispensing component. The two or more identifiers indicate the specific currency denomination assigned to the respective currency dispensing component.

In some embodiments, each of the two or more identifiers is braille.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques described herein are generally directed to an improved automated teller machine ("ATM"). For example, one or more techniques described herein are generally directed to an ATM with two or more currency dispensing components, in which each currency dispensing component is dedicated to a specific currency denomination. The improved ATM allows users to not only request a withdrawal amount, but also to allow users to request the specific currency denomination in which the withdrawal amount will be output.

Conventional ATMs are limited to single currency dispensing components that merely output the requested withdrawal amount. Further, conventional ATMs may further be limited to single currency dispensing components that allow users to request specific denominations, but still output the withdrawal amount via the single currency dispensing component. Such ATMs create several issues for vision-impaired users. For example, conventional ATMs with single currency dispensing components are unable to signal to the user which currency bills are which when output. The present disclosure addresses the limitations of conventional ATMs by providing multiple currency output components, with each currency output component dedicated to a specific currency denomination. Further, the ATMs of the present disclosure provide braille identifiers adjacent to each currency output component that signal to the user which currency output component is dedicated to which currency denomination.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
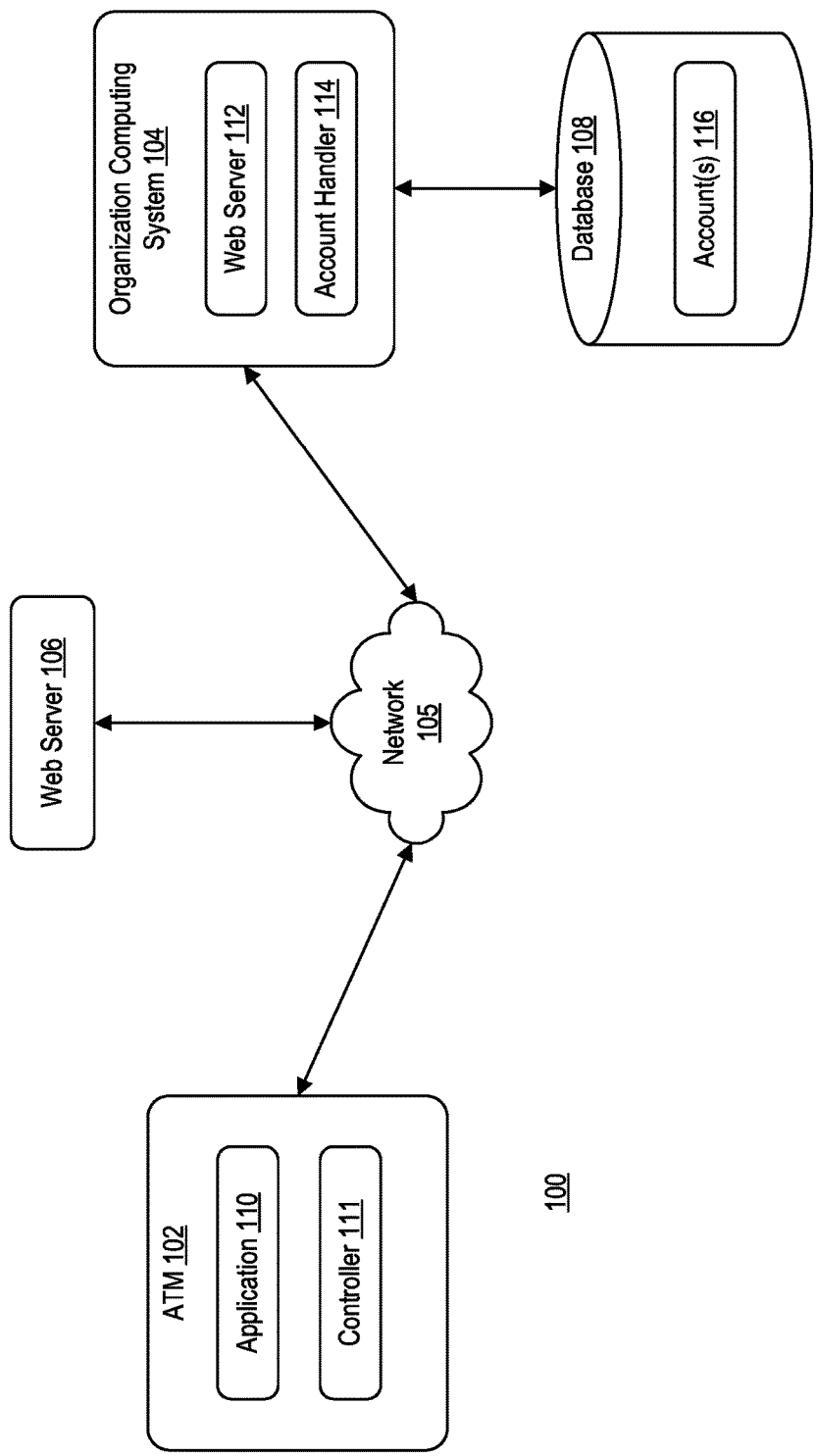
FIG. 1 is a block diagram illustrating a computing environment, according to one exemplary embodiment.

FIG. 1 is a block diagram illustrating a computing environment 100, according to one embodiment. Computing environment 100 may include at least an automated teller machine (ATM) 102 and an organization computing system 104 communicating via network 105. In some embodiments, computing environment 100 may further include a web server 106. Web server 106 may be logically positioned between ATM 102 and organization computing system 104.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may include any type of computer networking arrangement used to exchange information. For example, network 105 may be the Internet, a private data network, virtual private network using a public network and/or other suitable connection(s) that enables components in computing environment 100 to send and receiving information between the components of system 100.

ATM 102 may be operated by one or more users. For example, a user may operate ATM 102 to perform one or more functions associated with a user's bank account. Such functions may include, for example, withdrawing funds, depositing funds, transferring funds, checking an account balance, and the like. In operation, a user may obtain ATM 102 functionality via an ATM card assigned to the user. For example, a user may obtain ATM 102 access by inserting the user's ATM card and entering a personal identification number (PIN) preset by the user.

ATM 102 may include application 110 and controller 111. Controller 111 may be a computing system that is configured to facilitate communication between organization computing system 106 and the user. In some embodiments, controller 103 may facilitate communication between web server 106 and ATM 102. In turn, web server 106 may communicate with organization computing system 104. In such embodiments, ATM 102 may not be in direct communication with organization computing system 104.

Application 110 may be representative of a web browser that allows access to a website or a stand-alone application. Controller 111 may use application 110 to access functionality of organization computing system 104 and/or web server 106. Controller 111 may leverage application 110 to communicate over network 105 to request a webpage, for example, from organization computing system 104. For example, ATM 102 may be configured to execute application 110 to access one or more functionalities managed by organization computing system 104. In some embodiments, the content that is displayed via ATM 102 may be transmitted from organization computing system 104 to controller 111, and subsequently processed by application 110 for display through a graphical user interface (GUI) of ATM 102. In some embodiments, the content that is displayed via ATM 102 may be transmitted from organization computing system to web server 106, and then from web server 106 to controller 111. Application 110 may subsequently process the content for display through GUI of ATM 102.

Web server 106 may be associated with ATM 102. For example, web server 106 may be used as an intermediary between ATM 102 and organization computing system 104. As such, rather than ATM 102 communicate directly with organization computing system 104 via controller 111, ATM 102 may communicate with web server 106. Web server 106 may communicate with organization computing system 104 on behalf of ATM 102. For ease of discussion, reference to requests transmitted from ATM 102 and received at ATM 102 will be in reference to ATM 102 communicating directly with organization computing system 104. Those skilled in the art may readily understand how web server 106 may be logically positioned between ATM 102 and organization computing system 104 to facilitate communication there between.

Organization computing system 104 may include at least a web server 112 and an account handler 114. Web server 112 may include a computer system configured to generate and provide one or more functionalities to customers or users, via ATM 102. For example, web server 112 may facilitate communication between ATM 102 and organization computing system 104, such that a user of ATM 102 can manage (or transact) using the user's account with organization.

Account handler 114 may be configured to receive one or more request from ATM 102 and manage an account associated with the user to carry out the request. Account handler 114 may communicate with database 108. Database 108 may include one or more accounts 116. Such accounts 116 may include, for example, credit card accounts, savings accounts, checking accounts, and the like.

In operation, for example, upon receiving an authentication request that includes a user identifier (e.g., account number) and a personal identification number (PIN) from ATM 102, account handler 114 may carry out the authentication request by querying the database 108 with the user's account number to determine whether the received PIN matches the PIN in user's account 116. Upon authenticating the user, organization computing system 104 may transmit a confirmation back to ATM 102, such that ATM 102 can provide the user with further prompts for further requests. Such authentication of the user may establish a "session" between the user and organization computing system 104.

In another operation, for example, upon a session being established between the user and organization computing system 104, account handler 114 may carry out a withdrawal request from the user by querying database 108 to determine whether there are sufficient funds in user's account 116 to satisfy the request. Upon determining there are sufficient funds, organization computing system 104 may transmit a confirmation message to ATM 102. In some embodiments, along with the confirmation message, organization computing system 104 may further transmit a message containing an updated balance of the user's account 116.

Figure 2:
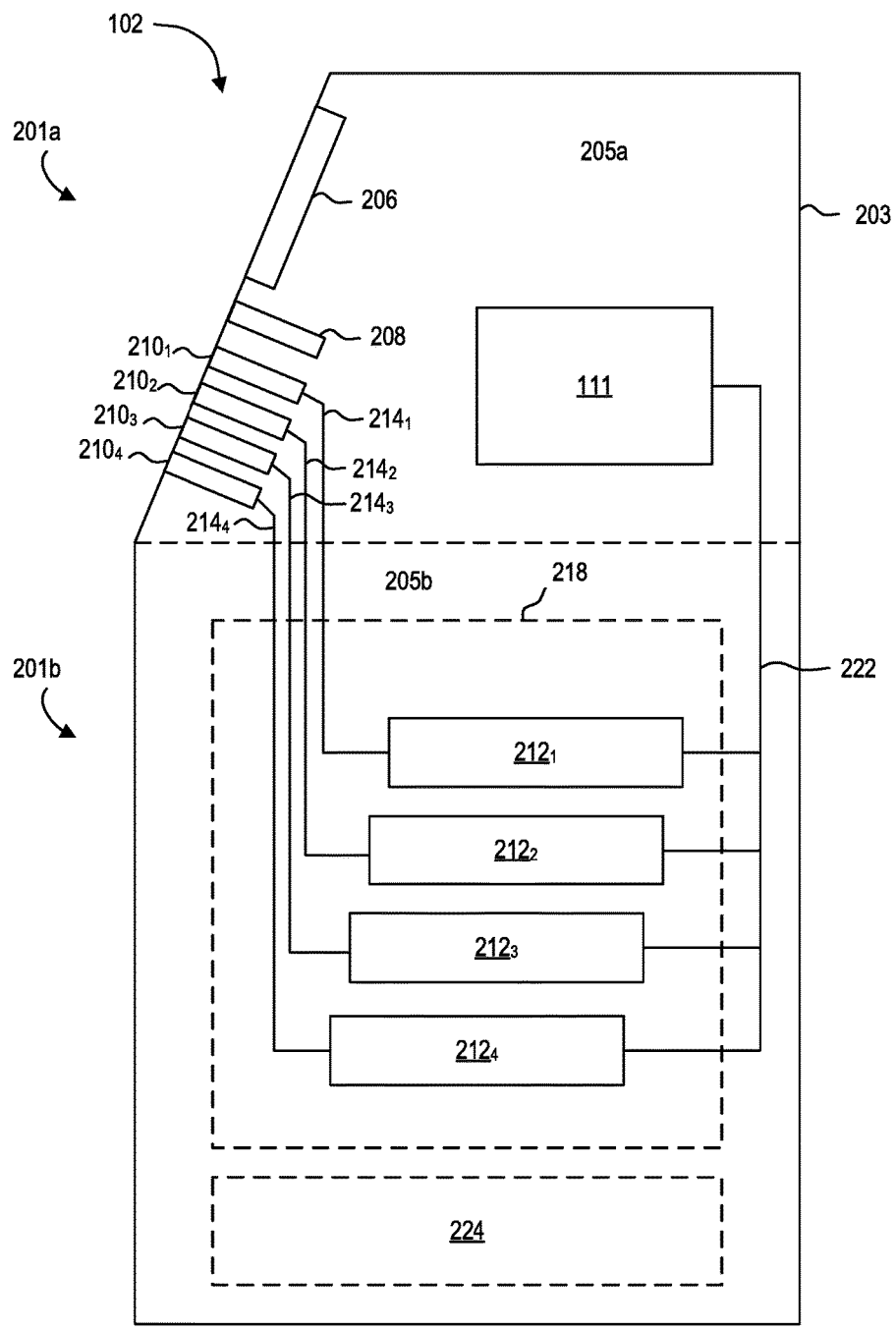
FIG. 2 is a cross-sectional view of an automated teller machine (ATM), according to one exemplary embodiment.

FIG. 2 is a cross-sectional side view of ATM 102, according to one exemplary embodiment. ATM 102 may include a body 203. Body 203 may be formed from a variety of materials, such as, but not limited to steel materials, stainless steel materials, non-metal materials, and the like. Body 203 may include a first portion 201a and a second portion 201b. First portion 201a of body 203 may define a first interior volume 205a. Second portion 201b of body 203 may define a second interior volume 205b. First portion 201a may be in fluid communication with second portion 201b.

First portion 201a of body 203 may include at least a display 206, a payment card component 208, two or more currency dispensing components $210_1$-$210_4$ (hereinafter "currency dispensing component 210"), and controller 111. In some embodiments, display 206 may partially extend exterior to first interior volume 205a. Generally, display 206 may be positioned at least partially within first interior volume 205a, such that a user of ATM 102 may view content displayed on display 206. Payment card component 208 may be configured to receive a payment card from user of ATM 102. For example, payment card component 208 may be configured to receive the payment card to identify an account associated therewith. In some embodiments, payment card component 208 may include a magnetic stripe reader. Magnetic stripe reader may be configured to read a magnetic stripe positioned on an incoming payment card. In some embodiments, payment card component 208 may include an integrated circuit reader. Integrated circuit reader may be configured to read an integrated circuit positioned on an incoming payment card.

Each currency dispensing component 210 may be configured to dispense a specific, dedicated currency denomination. For example, currency dispensing component $210_1$ may be configured to dispense $5 bills; currency dispensing component $210_2$ may be configured to dispense $10 bills; currency dispensing component $210_3$ may be configured to dispense $20 bills; and currency dispensing component $210_4$ may be configured to dispense $50 bills. Although four currency dispensing components 210 are shown, those skilled in the art may readily understand that greater or less than four currency dispensing components 210 may be used.

Second portion 201b of body 203 may include two or more currency cartridges $212_1$-$212_4$ (generally "currency cartridge 212"), two or more tracks $214_1$-$214_4$ (generally "track 214"), and logic 222 connecting each currency cartridge 212 to controller 111. Each currency cartridge 212 may be configured to store a specific, dedicated currency denomination. For example, currency cartridge $212_1$ may be configured to store $5 bills; currency cartridge $212_2$ may be configured to store $10 bills; currency cartridge $212_3$ may be configured to store $20 bills; and currency cartridge $212_4$ may be configured to store $50 bills. As such, each currency cartridge 212 may correspond to a respective currency dispensing component 210. For example, currency cartridge $212_1$ may correspond to currency dispensing component $210_1$; currency cartridge $212_2$ may correspond to currency dispensing component $210_2$; currency cartridge $212_3$ may correspond to currency dispensing component $210_3$; and currency cartridge $212_4$ may correspond to currency dispensing component $210_4$. Although four currency cartridges 212 are shown, those skilled in the art may readily understand that greater or less than four currency cartridges 212 may be used.

Tracks 214 may be configured to transfer currency from a currency cartridge 212 to a currency dispensing component 210. Each track 214 may extend between a respective currency dispensing component 210 and a currency cartridge 212. For example, track $214_1$ may extend between currency cartridge $212_1$ and currency dispensing component $210_1$; track $214_2$ may extend between currency cartridge $212_2$ and currency dispensing component $210_2$; track $214_3$ may extend between currency cartridge $212_3$ and currency dispensing component $210_3$; and track $214_4$ may extend between currency cartridge $212_4$ and currency dispensing component $210_4$. Although four tracks 214 are shown, those skilled in the art may readily understand that greater or less than four tracks 214 may be used.

In some embodiments, second portion 201b of body 203 may further include a security box 218. Security box 218 may house currency cartridges 212. For example, security box 218 may be a secure, lockable box that protects currency cartridges 212 from theft, damage, fire, tampering, and the life. Further, in some embodiments, second portion 201b of body 203 may further include a deposit box 224. Deposit box 224 may be configured to store one or more items deposited to ATM 102. For example, deposit box 224 may be configured to store currency, checks, and the like.

Figure 3:
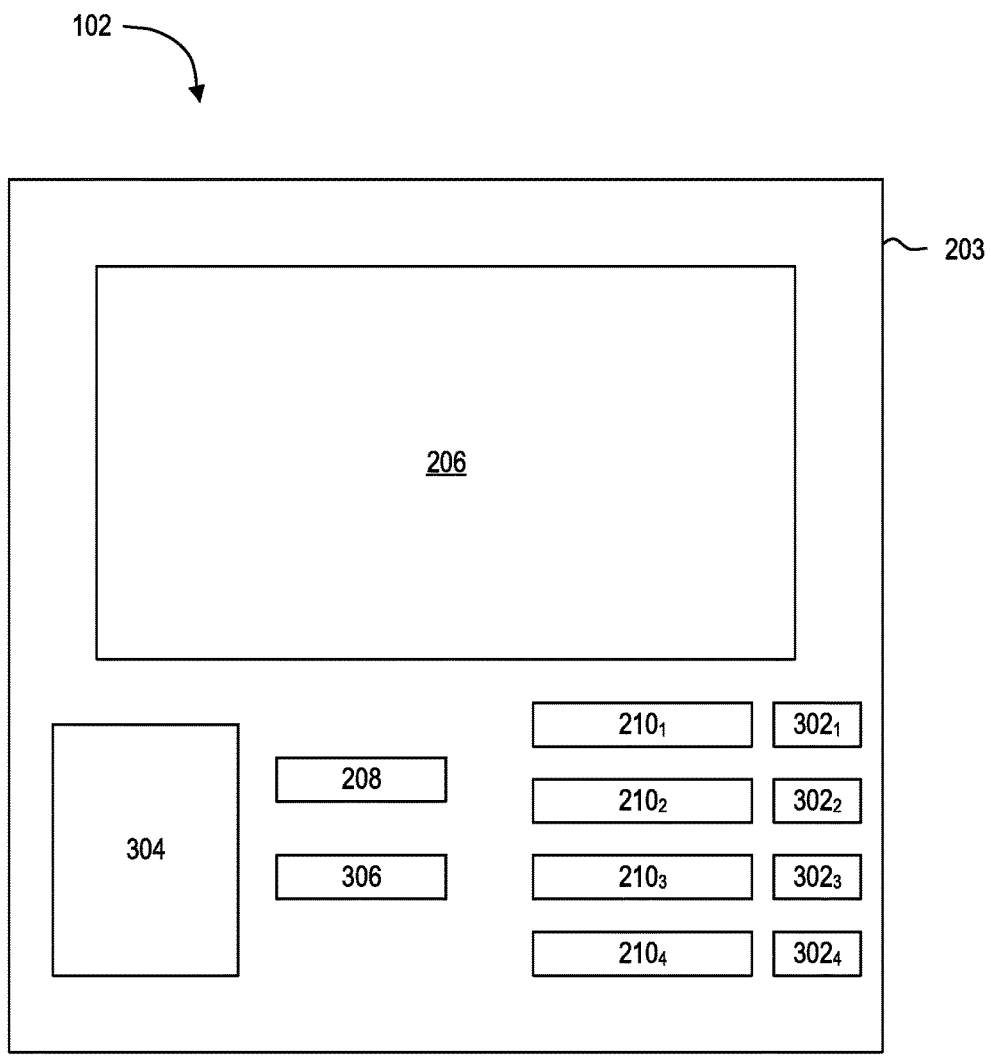
FIG. 3 is a partial view of the ATM of FIG. 2, according to one exemplary embodiment.

FIG. 3 is a front schematic view of a portion of ATM 102, according to one exemplary embodiment. For example, FIG. 3 illustrates a front schematic view of first portion 201a of body 203.

As illustrated, in some embodiments, currency dispensing components 210 may be vertically stacked. Although not shown, those skilled in the art may readily understand that currency dispensing components 210 may be horizontally disposed, staggered, or disposed in various positions.

Body 203 may further include one or more identifiers $302_1$-$302_4$ (generally "identifier 302"). Each identifier 302 may signal to a user of ATM 102 which currency dispensing component 210 dispenses which specific currency denomination. As illustrated, identifier $302_1$ may correspond to currency dispensing component $210_1$; identifier $302_2$ may correspond to currency dispensing component $210_2$; identifier $302_3$ may correspond to currency dispensing component $210_3$; and identifier $302_4$ may correspond to currency dispensing component $210_4$.

In some embodiments, each identifier 302 may be braille identifiers that signal to a vision-impaired individual, which currency dispensing component 210 dispenses which currency denomination. As such, a vision-impaired individual may be able to decipher among the different currency denominations, which is plainly impossible for single currency dispensing component ATMs.

In some embodiments, vision-impaired individuals may have the option to connect an audio input/output device (e.g., headphones, microphones, and the like) to ATM 102 to communicate with ATM 102. ATM 102 may audibly instruct the user which currency dispensing component 210 is dispensing a certain denomination.

Further, in some embodiments, ATM 102 may further include keypad 304 and deposit component 306. Keypad 304 may allow user of ATM 102 to input specific information, such as, but not limited to, the user's PIN. Deposit component 306 may be in communication with deposit box 224. Deposit component 306 may be configured to receive one or more deposits from users of ATM 102.

Figure 4:
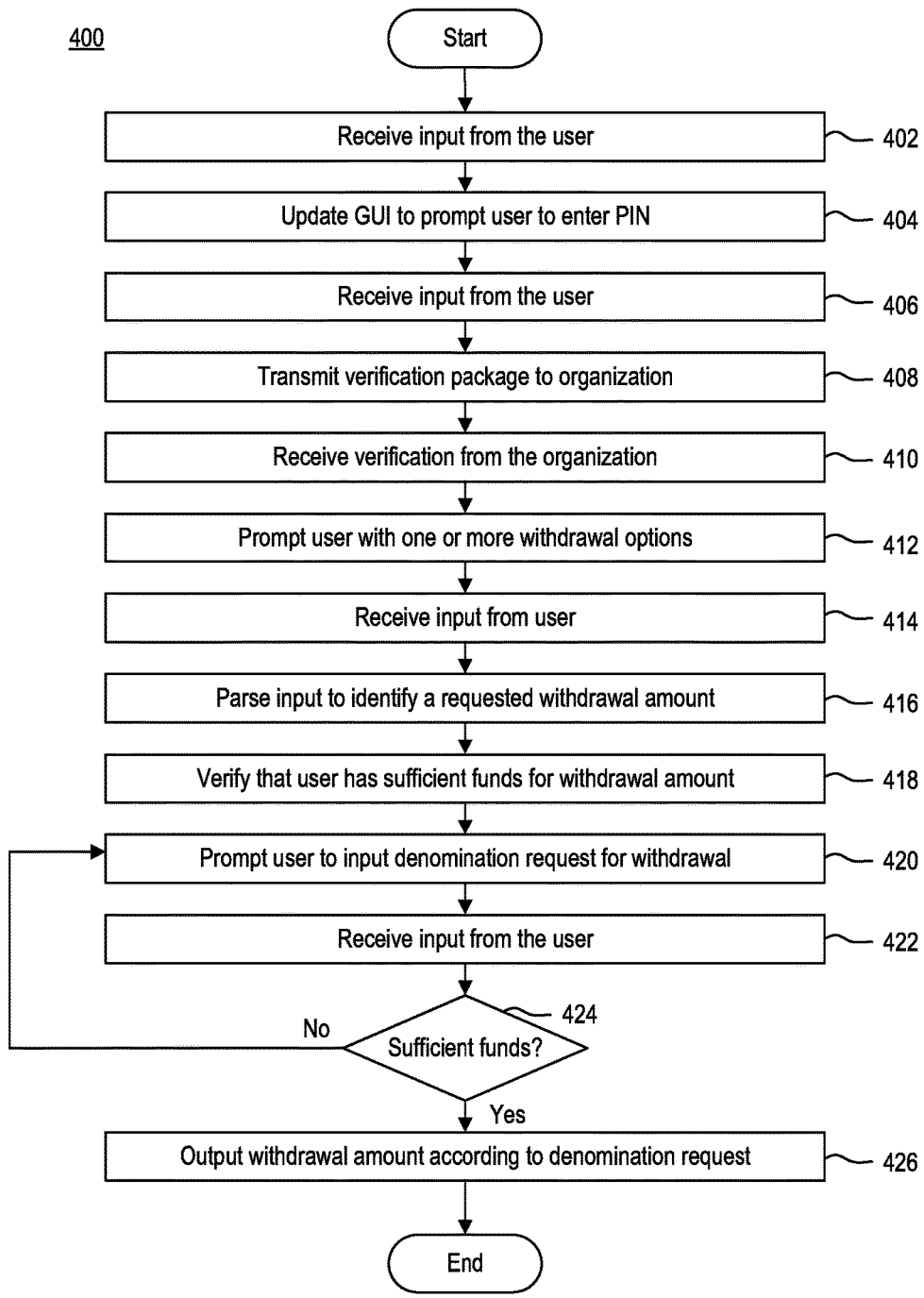
FIG. 4 is a flow diagram of a method of transacting at an ATM, according to one exemplary embodiment.

FIG. 4 is a flow diagram of a method 400 of transacting at ATM 102, according to one exemplary embodiment. Method 400 may begin at step 402. At step 402, controller 111 may receive an input from the user. For example, controller 111 may detect that user has inserted a payment card into payment card component 208.

At step 404, controller 111 may update a graphical user interface (GUI) displayed to user via display 206. For example, controller 111 may update GUI to prompt a user to enter a PIN associated with the entered payment card. At step 406, controller 111 may receive input from the user. For example, controller 111 may receive input in the form of the user's PIN, in response to prompting the user to provide the PIN.

At step 408, controller 111 may transmit a verification package to organization computing system 104. The verification package may include, for example, at least personal identification information associated with the inputted payment card (e.g., payment card number, name on the payment card, expiration date, card security code, etc.) and the PIN entered by the user. At step 410, controller 111 may receive a verification message from organization computing system 104. For example, organization computing system 104 may have queried database 108 to determine whether the information received in the verification package matches information stored in an account 116.

At step 412, controller 111 may prompt the user with one or more withdrawal options. For example, controller 111 may prompt the user to enter a withdrawal amount. For example, the user may enter a withdrawal amount of $200.

At step 414, controller 111 may receive input from the user. For example, in response to prompting the user with one or more withdrawal option, the user may enter a withdrawal amount and a denomination request.

At step 416, controller 111 may parse the input to identify the requested withdrawal amount. At step 418, controller 111 may verify that the user has sufficient funds for the requested withdrawal amount. For example, controller 111 may transmit a request to organization computing system 104 for organization computing system 104 to determine whether the user has sufficient funds to cover the requested withdrawal.

At step 420, controller 111 may update GUI to prompt the user to input a denomination request for the withdrawal. For example, controller 111 may prompt the user to provide the specific denominations for which the withdrawal will be provided. Continuing with the above example, the user may enter a withdrawal amount of $200 and a denomination request of twenty $5 bills, five $10 bills, and one $50 bill.

At step 422, controller 111 may receive input from the user. For example, controller 111 may receive a denomination request input in response to prompting the user to input the denomination request.

At step 424, controller 111 may determine whether there are sufficient funds in ATM 102 to satisfy the denomination request. For example, controller 111 may determine whether there is a sufficient number of each denomination in the denomination request to satisfy the user's input.

If, at step 424, controller 111 determines that there are not sufficient funds in ATM 102 (e.g., there is not a sufficient amount of a particular denomination to satisfy the denomination request), method 400 may revert to step 420, and controller 111 may update GUI to prompt user to input another denomination request for the withdrawal. If, however, at step 424, controller 111 determines that there are sufficient funds in ATM 102, then method 400 proceeds to step 426.

At step 426, controller 111 may instruct one or more components of ATM 102 to output the withdrawal amount according to the denomination request. For example, controller 111 may instruct each currency cartridge 212 to output a specific number of bills. Continuing with the above examples, controller 111 may instruct cartridge $212_1$ to output twenty $5 bills, cartridge $212_2$ to output five $10 bills, and cartridge $212_4$ to output one $50 bills.

Figure 5:
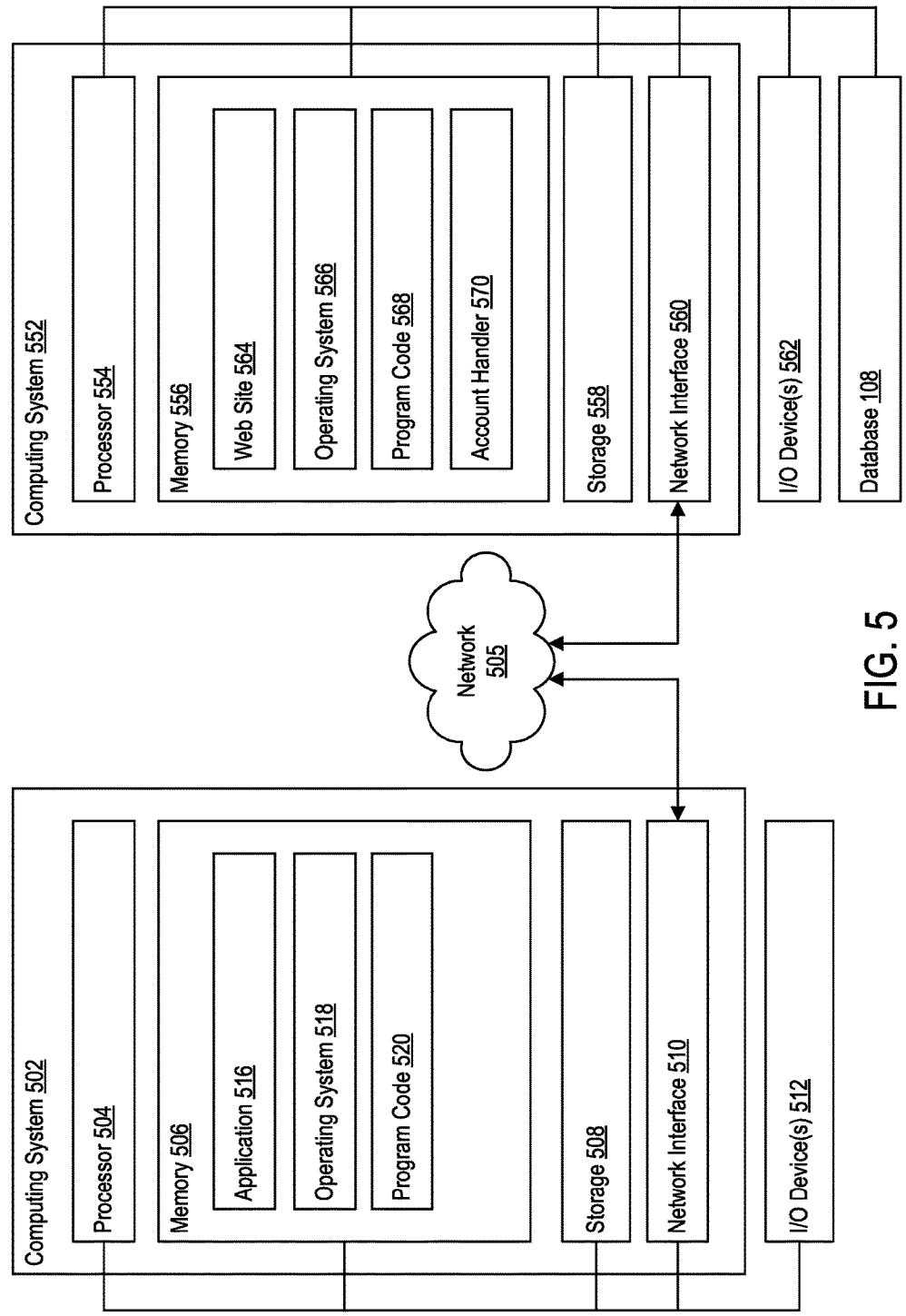
FIG. 5 is a block diagram illustrating a computing environment, according to one embodiment.

FIG. 5 is a block diagram illustrating an exemplary computing environment 500, according to some embodiments. Computing environment 500 includes computing system 502 and computing system 552. Computing system 502 may be representative of controller 111. Computing system 552 may be representative of organization computing system 104.

Computing system 502 may include a processor 504, a memory 506, a storage 508, and a network interface 510. In some embodiments, computing system 502 may be coupled to one or more I/O device(s) 512 (e.g., keyboard, mouse, etc.).

Processor 504 may retrieve and execute program code 520 (i.e., programming instructions) stored in memory 506, as well as stores and retrieves application data. Processor 504 may be included to be representative of a single processor, multiple processors, a single processor having multiple processing cores, and the like. Network interface 510 may be any type of network communications allowing computing system 502 to communicate externally via computing network 505. For example, network interface 510 can be configured to enable external communication with computing system 552.

Storage 508 may be, for example, a disk storage device. Although shown as a single unit, storage 508 may be a combination of fixed and/or removable storage devices, such as fixed disk drives, removable memory cards, optical storage, network attached storage (NAS), storage area network (SAN), and the like.

Memory 506 may include application 516, operating system 518, and program code 520. Program code 520 may be accessed by processor 504 for processing (i.e., executing program instructions). Program code 520 may include, for example, executable instructions for communicating with computing system 552 to provide user with one or more functionalities associated with a user's account with a financial organization. Program code 520 may also include, for example, executable instructions for allowing a user to request specific denominations in a withdrawal event.

Computing system 552 may include a processor 554, a memory 556, a storage 558, and a network interface 560. In some embodiments, computing system 552 may be coupled to one or more I/O device(s) 562. In some embodiments, computing system 552 may be in communication with database 108.

Processor 554 may retrieve and execute program code 568 (i.e., programming instructions) stored in memory 556, as well as stores and retrieves application data. Processor 554 is included to be representative of a single processor, multiple processors, a single processor having multiple processing cores, and the like. Network interface 560 may be any type of network communications enabling computing system 552 to communicate externally via computing network 505. For example, network interface 560 allows computing system 552 to communicate with computer system 502.

Storage 558 may be, for example, a disk storage device. Although shown as a single unit, storage 558 may be a combination of fixed and/or removable storage devices, such as fixed disk drives, removable memory cards, optical storage, network attached storage (NAS), storage area network (SAN), and the like.

Memory 556 may include website 564, operating system 566, program code 568, and account handler 570. Program code 568 may be accessed by processor 554 for processing (i.e., executing program instructions). Program code 568 may include, for example, executable instructions configured to perform steps discussed above in conjunction with FIG. 4. As an example, processor 554 may access program code 568 to perform operations for transacting at an ATM (e.g., ATM 102). Website 564 may be accessed by computing system 502. For example, website 564 may include content accessed by computing system 502 via a web browser or application.

Account handler 570 may be configured to manage one or more accounts 116 stored in database 108. For example account handler 570 may be used to confirm the identities of users requesting a withdrawal at an ATM, determine whether the user has sufficient funds to cover the withdrawal request, and the like.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. An apparatus, comprising:
a body defining an interior volume;
a display disposed in the interior volume;
two or more currency dispensing components, each currency dispensing component dedicated to a specific currency denomination;
two or more currency cartridges configured to store currency, each currency cartridge dedicated to a specific currency denomination, wherein there is a one to one correspondence between the two or more currency dispensing components and the two or more currency cartridges;
two or more tracks, each track extending between a currency dispensing component and a currency cartridge, the two or more tracks configured to transmit currency from the two or more currency cartridges to the two or more currency dispensing components; and
a controller in communication with the display, the two or more currency dispensing components, the two or more currency cartridges, and the two or more tracks.

2. The apparatus of claim 1, further comprising:
two or more identifiers, each identifier positioned adjacent each respective currency dispensing component, the two or more identifiers indicating the specific currency denomination assigned to the respective currency dispensing component.

3. The apparatus of claim 1, wherein each of the two or more identifiers are braille.

4. The apparatus of claim 1, further comprising:
a payment card receiving component.

5. The apparatus of claim 1, wherein a first currency dispensing component of the two or more currency dispensing components outputs a first dedicated currency denomination.

6. The apparatus of claim 5, wherein a second currency dispensing component of the two or more currency dispensing components outputs a second dedicated currency denomination, different from the first dedicated currency denomination.

7. The apparatus of claim 1, further comprising:
a deposit component configured to receive one or more deposits.

8. A computer system, comprising:
an automated teller machine (ATM) comprising a display, two or more currency dispensing components, each currency dispensing component dedicated to a specific currency denomination, two or more currency cartridges configured to store currency, each currency cartridge dedicated to a specific denomination, wherein there is a one to one correspondence between the two or more currency dispensing components and the two or more currency cartridges, and a controller, the controller comprising:
a processor; and
a memory having programming code stored thereon, which, when executed by the processor, performs an operation, comprising:
receiving a first input from a user via a payment card component in the ATM;
receiving, via the display, one or more user credentials;
verifying the user credentials with a third party organization;
upon receiving verification from the third party organization, prompting the user to submit a withdrawal request comprising a withdrawal amount and a denomination request; and
dispensing the withdrawal amount according to the denomination request, wherein each denomination is output via the dedicated currency dispensing component.

9. The computer system of claim 8, wherein dispensing the withdrawal amount according to the denomination request, wherein each denomination is output via the dedicated currency dispensing component, comprises:
dispensing a first portion of the withdrawal amount via a first currency dispensing component of the two or more currency dispensing components;
determining that the user removed the first portion of the withdrawal amount from the first currency dispensing component; and
dispensing a second portion of the withdrawal amount via a second currency dispensing component of the two or more currency dispensing components.

10. The computer system of claim 8 wherein dispensing the withdrawal amount according to the denomination request, wherein each denomination is output via the dedicated currency dispensing component, comprises:
simultaneously dispensing a first portion of the withdrawal amount via a first currency dispensing component of the two or more currency dispensing components and a second portion of the withdrawal amount via a second currency dispensing component of the two or more currency dispensing components.

11. The computer system of claim 8, wherein receiving the user credentials, comprises:
receiving, via a number pad in the ATM, a personal identification number.

12. The computer system of claim 11, wherein verifying the user credentials with the third party organization, comprises:
generating a verification packet comprising the personal identification number and a number of a payment card inputted via the payment card component;
identifying a financial organization associated with the payment card; and
transmitting the verification packet to a web server associated with the financial organization.

13. The computer system of claim 8, wherein receiving the first input from the user via the payment card component in the ATM, comprises:
receiving a payment card via the payment card component;
determining that the payment card includes a magnetic stripe; and
identifying a user account number via the magnetic stripe.

14. The computer system of claim 8, wherein receiving the first input from the user via the payment card component in the ATM, comprises:
receiving a payment card via the payment card component;

determining that the payment card includes an integrated circuit embedded therein; and identifying a user account number via the integrated circuit.

15. An apparatus, comprising:

a body defining an interior volume, a display disposed in the interior volume;

two or more currency dispensing components, each currency dispensing component dedicated to a specific currency denomination;

two or more currency cartridges configured to store currency, each currency cartridge dedicated to a specific currency denomination, wherein there is a one to one correspondence between the two or more currency dispensing components and the two or more currency cartridges;

a controller in communication with the display, the two or more currency dispensing components, and the two or more currency cartridges, the controller, comprising:

a processor; and a memory having programming code stored thereon, which, when executed by the processor, performs an operation, comprising:

receiving, via the display, a withdrawal request comprising a withdrawal amount and a denomination request; and dispensing the withdrawal amount according to the denomination request, wherein each denomination is output via the dedicated currency dispensing component.

16. The apparatus of claim 15, further comprising:

two or more tracks, each track extending between a currency dispensing component and a currency cartridge, the two or more tracks configured to transmit currency from the two or more currency cartridges to the two or more currency dispensing components.

17. The apparatus of claim 15, wherein dispensing the withdrawal amount according to the denomination request, wherein each denomination is output via the dedicated currency dispensing component, comprises:

dispensing a first portion of the withdrawal amount via a first currency dispensing component of the two or more currency dispensing components;

determining that the user removed the first portion of the withdrawal amount from the first currency dispensing component; and dispensing a second portion of the withdrawal amount via a second currency dispensing component of the two or more currency dispensing component.

18. The apparatus of claim 15, wherein dispensing the withdrawal amount according to the denomination request, wherein each denomination is output via the dedicated currency dispensing component, comprises:

simultaneously dispensing a first portion of the withdrawal amount via a first currency dispensing component of the two or more currency dispensing components and a second portion of the withdrawal amount via a second currency dispensing component of the two or more currency dispensing components.

19. The apparatus of claim 15, further comprising:

two or more identifiers, each identifier positioned adjacent each respective currency dispensing component, the two or more identifiers indicating the specific currency denomination assigned to the respective currency dispensing component.

20. The apparatus of claim 15, wherein each of the two or more identifiers are braille.

* * * * *